United States Patent [19]

Nakajima et al.

[11] Patent Number: 4,820,462
[45] Date of Patent: Apr. 11, 1989

[54] METHOD OF REMOVING BINDER MATERIAL FROM SHAPED PREFORM BY EXTRACTING IN LIQUIDIZED FLUID

[76] Inventors: Nobuaki Nakajima, 1-2-2, Minamihara Hiratsuka-city, Kanagawa; Seiji Yasuhara, 409-5, Guzo Hiratsuka-city, Kanagawa; Mamoru Ishihara, 216-2, Ino Hiratsuka-city, Kanagawa, all of Japan

[21] Appl. No.: 813,222

[22] Filed: Dec. 24, 1985

[30] Foreign Application Priority Data

Dec. 26, 1984 [JP] Japan .................................. 59-273487

[51] Int. Cl.$^4$ .............................................. C04B 35/64
[52] U.S. Cl. ...................................... 264/63; 264/233; 264/344
[58] Field of Search ........................ 264/63, 344, 233

[56] References Cited

U.S. PATENT DOCUMENTS

| | | | |
|---|---|---|---|
| 2,939,199 | 6/1960 | Strivens | 264/63 |
| 3,806,619 | 4/1974 | Zosel | 426/478 |
| 3,953,562 | 4/1976 | Hait et al. | |
| 4,104,409 | 8/1978 | Vitzthum et al. | 426/386 |
| 4,167,589 | 9/1979 | Vitzthum et al. | 426/312 |
| 4,241,112 | 12/1980 | Kostandov et al. | 427/213 |
| 4,354,922 | 10/1982 | Derbyshire et al. | 208/68 |

FOREIGN PATENT DOCUMENTS 615429 2/1961 Canada .................................. 264/63

Primary Examiner—James Derrington
Attorney, Agent, or Firm—Stewart L. Gitler; Martin P. Hoffman; Mitchell B. Wasson

[57] ABSTRACT

There is provided a method of removing binding material from a shaped preform (green body) in the preparation procedure for the manufacture of ceramics from particulate materials by a new method comprising exposing the green body to a liquidified fluid to dissolve the binder materials in a liquidified fluid without deformation of the shape of the article. In the method, the binder materials can be removed without swelling of the article because the green body is not exposed to a rapid temperature increase and the binder does not volatilize in the body. Further the binder material can be removed in a shorter period of time from the entire body.

7 Claims, 1 Drawing Sheet

METHOD OF REMOVING BINDER MATERIAL FROM SHAPED PREFORM BY EXTRACTING IN LIQUIDIZED FLUID

FIELD OF THE INVENTION

The present invention relates to a method of removing a binder material from a preform in pre-sintering preparation of ceramics before sintering the shaped preform. Particularly it relates to a method of removing efficiently binder material from the preform body in the preparation step before sintering the shaped preform comprising refractory (heat resistant) particulate material and binder material.

The term "preform" herein is used to describe a shaped body formed from particulate raw material such as ceramic raw material, for example, metal powder, metal oxide powder, refractory particulate material, such as nitrides, carbides, and the mixture thereof, by appropriate forming techniques such as moulding, injection, compressing, and extruding in a pre-sintering preparation for the production of ceramic material in the desired shape. The preform can be said to be the shaped "green" ceramic material and must be fired in a kiln or a furnace in the neighbourhood of any temperature which would produce sintered grains of the desired ceramic material.

The preform must be formed by containing small amount of binder material(s) other than the particulate raw material(s), because only raw powder can not be formed into a certain shape of the body and the addition of binder material(s) to the raw powder can impart some formability of the powder, that can be considered as imparting smoothness among the material particles and some rigidity to the formed body.

DESCRIPTION OF THE PRIOR ART

In the production of ceramics from refractory particulate materials, the particulate raw material must be formed into a preform of a given shape, for example, by compressing or moulding or extruding into the shaped preform, then the so prepared preform must be sintered to produce ceramics of the given shape. In those pre-sintering preparation procedures, generally, binder material(s) in an amount of order of 5 to 30 weight % would be added to a particulate raw material so as to impart plasticity to the particulate material and further to impart strength to the shaped preform.

When the preform is fired as it is, the binder contained in the preform will rapidly vaporize to expand the preform and/or to same. As a result, all fired products would be substandard. Therefore, binder materials must be removed (defat), before sintering a preform. There have been practiced various processes for the removal of binder materials, for example, the process comprising increasing the temperature very slowly under atmospheric pressure, the process comprising putting the preform in an atmosphere of reduced pressure with increasing the temperature very slowly, and the process comprising contacting with an inert gas passing by the preform with increasing the temperature very slowly.

However, when the removal (defat) of the binder materials is carried out in short period of time, the preform is affected by expansion of the preform or gasification of the binder materials to generate deformation such as fracture, swelling, and bending. Therefore, an extremely long period of time (several days) is necessary in slow removal.

This is significant particularly to the preform containing binder in a greater amount, and to the thick preform. Therefore, there are found many problems particularly in much longer period for defat, such as less treatment quantity and higher energy cost.

SUMMARY OF THE INVENTION

The inventors have been investigating techniques for the efficient removal of binder materials from the formed preform to be used for the production of ceramics and, at last, have developed a process of effectively removing binder materials from the preform in a relatively short period and further found that the binder that has been removed can be re-utilized or recycled by the developed process.

It is an object of the present invention to provide a method capable of efficiently removing the binder materials from the preform in the pre sintering preparation for the production of ceramics of the given shape.

It is another object of the invention to provide a process of removing the binder material from the preform in a relatively shorter period of time in the pre-sintering preparation.

It is a further object of the invention to provide a system of recycling the binder materials in the forming of the preform and the removal of the binder materials from the preform for the pre-sintering preparation procedure of the production of refractory ceramic material.

The foregoing and other objects of the present invention can be attained by the following description.

DETAILED DESCRIPTION OF PREFERRED EMBODIMENTS

Figure 1:
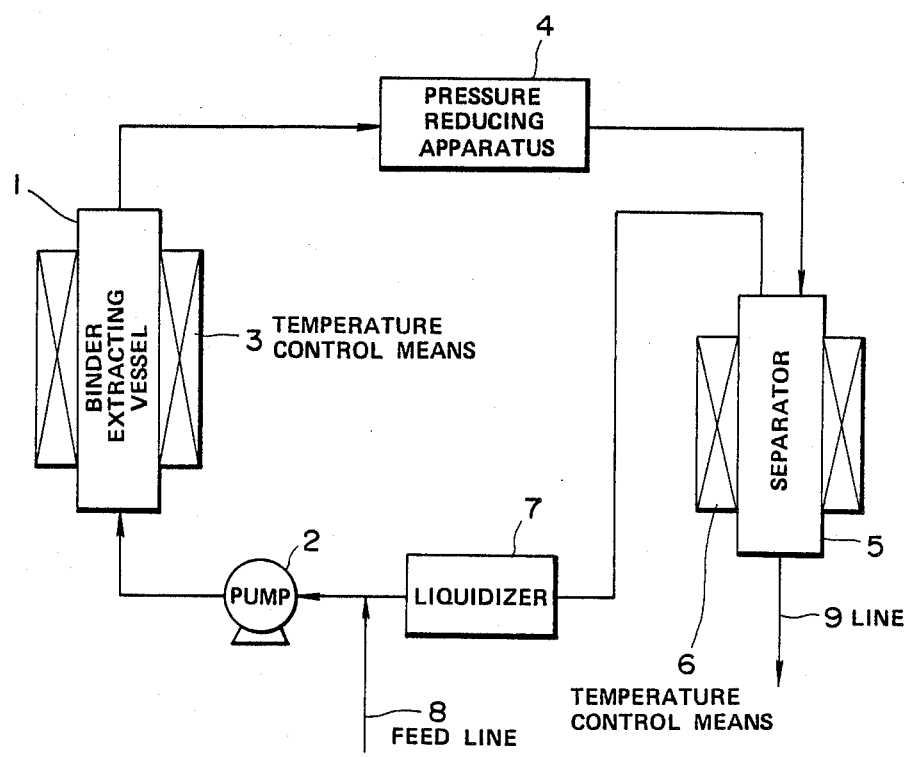
FIG. 1 is a schematic view of one embodiment a of system for carrying out the present invention.

In accordance with the present invention, the novel process for removing binder materials from the preform to be used for the production of shaped ceramics is illustrated and applied to the method of the production of ceramics in the given shape and ceramics product produced thereby.

After intensive research for an efficient process of making ceramic material from particulate raw material, the inventors developed the efficient removal of binder materials from the preform in the pre-sintering preparation for the production of ceramic material in the desired shape. The efficient process which the inventors have developed for removing binder material(s) from the preform in a pre-sintering preparation for the production of ceramics in a given shape comprises exposing the preform comprising refractory particulate material(s) and binder material(s) in a given shape to fluid in the liquidized state thereby to dissolve binder materials in the liquidized fluid; discharging the fluid from a vessel under liquidizing condition; and recovering binder materials from the fluid by reducing the pressure to the fluid or elevating the temperature of the fluid thereby to recycle the binder materials and fluid for further use thereof.

The ability of the liquidized fluid to function as a solvent is dependent on its density increase. The density of the fluid under the liquidizing condition is much higher than that of the gaseous fluid under ambient temperature and atmospheric pressure. Such increase of the density will elevate the affinity with the solute so as to accelerate the solvent power the fluid so that it functions very effectively as a separator.

The substance being extracted is solute in the liquidized fluid under the liquidizing condition. Such substance can be easily separated from the fluid, and easily recovered. The separation can be easily carried out by reducing the pressure at the constant temperature or elevating the temperature at the constant pressure so as to gasify the liquidized fluid.

In accordance with the present invention, the fluid should have a critical temperature higher than the operation temperature. Generally, because the extraction is carried out under the room temperature, the fluid should have the critical point above 0° C., and be gaseous at 0° C.

The binder materials should have two functions; one is to impart binding strength to the preform when the particulate material is moulded or shaped with binder materials into the preform, and the other is to impart the lubricity or lubricating action when the preform is being formed by injection moulding or extrusion or press.

The binder materials used commonly may be organic materials such as higher alcohols, higher fatty acid, higher hydrocarbons, polymers or resins.

The refractory particulate material used in the present invention may include metal powder, metal oxide powder, ceramic materials, such as nitrides, carbides, boronitrides, carbonitrides, and the mixture thereof.

The binder materials may include solid materials under ambient temperature, such as higher alcohols (for example octadecanol), fatty acids (for example stearic acid), wax, polyethylene and the like.

The fluid used in the present invention, which can be kept in a liquidized state may be a gas under ambient temperature and ambient pressure, the critical temperature of which is higher than 0° C. The fluid may be selected from the group consisting of $CO_2$, and Freon (Trademark for a series of fluorocarbon) gas and the mixture thereof.

In reference to the drawings, the present invention will be further illustrated in the following description.

The inventive process comprises two major steps of: (1) exposing a preform to fluid in a liquidized state thereby to remove binder materials from the preform and (2) isolating binder materials from the fluid so as to recover binder material for further recycling.

The preform is put in the binder extracting vessel 1, and then the fluid (for example, $CO_2$, and Freon gas) compressed by a pump 2 is fed in the vessel 1. A temperature control means 3 maintains the temperature in the vessel 1 lower than the critical temperature so as to keep the liquidized state. The preform is exposed to the fluid kept under the liquidized state in the vessel 1 (the liquidized fluid) so as to dissolve the binder materials from the preform into the fluid.

The liquidized fluid in which the binder materials are dissolved is transferred through a pressure reducing apparatus 4 to a separator 5 having a temperature control means 6 where the density of the fluid will be reduced so as to loose a dissolving powder and to isolate the binder materials from the fluid in a separator 5. The binder materials are continuously recovered from the line 9, and the recovered binder materials can be reutilized for forming a preform.

On the other hand, the fluid isolated in the vessel 5 is fed into the pump 2 through a liquidizer 7 to liquidize, so as to enable recycling. The supplementary feed is provided through a line 8.

In accordance with the present invention, the fluid kept in a liquidized state exhibits an extracting power by increase of density of the fluid enabling it to dissolve and remove the binder materials. In this process, the binder materials will not expand nor evaporate in the preform, which materials are dissolved into the liquidized fluid, resulting in substantially neither deformation nor defects in the preform.

In accordance with the present invention, the fluid or extraction of binder materials is present under the liquidizing condition, and therefore, the fluid becomes denser so that the fluid can dissolve more of the binder materials and remove them from the preform which is exposed to the liquidized fluid. However, the fluid should be at the temperature lower than the decomposition temperature of the binder, because it cannot be recovered nor recycled when it is above the decomposition temperature. Further, the operation temperature should be lower than the decomposition temperature of the binder materials.

In the conventional process for removal of binder materials by burning the materials, binder materials are gasified, and therefore, the phase change of solid to gas occurs to produce some expansion in the preform, that can easily generate some deformation or defects in the preform.

On the other hand, any phase change or volumetric change will not be generated where the binder materials can be extracted and removed by the liquidized fluid from the preform without any defects found in the preform.

In accordance with the present invention, the binder materials are substantially uniformly removed along the entire surfaces from the entire body of the preform. The substantially uniform extraction of the binder materials is evidenced by the lack of stress or deformation in the preform.

The inventors confirmed that in accordance with the present invention, $CO_2$, and lower halogenated carbon such as fluorocarbon, for example, Freon-12 (dichlorodifluoro methane; $CCl_2F_2$), can extract the following groups of the binder materials;

1. higher alcohol (such as octadecanol);
2. organic fatty acid (such as stearic acid); and
3. wax (such as paraffin).

Therefore, the binder materials comprising as a major component the above mentioned binder materials can be surely removed by the claimed process. However, it is to be noted that the claimed process can be applied to the other binder materials.

The inventors found that polymeric materials (e.g. resins) are difficult to extract, but the polymeric binder materials retained as a minor component contained in the shaped preform to the extent that they do not affect to the sintering step. In view of convenience of handling the preform in the subsequent steps, it is better to retain the binder materials in the preform rather than completely removing the binder materials.

In accordance with the present invention, the exposure of the preform to the liquidized fluid to remove binder materials can reduce drastically the necessary period of time for removing binder materials from the preform, and further, enables one to recover the binder materials for recycle of the materials.

Further, the fluid isolated can be recycled to the pump 2. Therefore, as shown in FIG. 1, the system utilizing the inventive process can be considered as an approximation to a closed circuit. In view of the foregoing, the inventive process can reduce the cost of energy, and therefore, is much more economical and saves materials and energy. It can be said that the inventors found an extremely efficient process for removal of binder materials from the preform.

The following examples illustrate the practice of the invention, but should not be interpreted for the limitation of the invention.

EXAMPLE

15 Weight parts of binder (octadecanol or stearic acid) was added to 100 weight parts of alumina (having grain size of 1 to 10 $\mu$m) and mixed. The mixture was pressed in a small size liquid pressure press to the pressure of 700 Kg/cm$^2$, into a moulding of preform. The moulding of preform was exposed to $CO_2$ or Freon-12 (fluorocarbon) in liquidized state so as to remove the binder material. The conditions and results thereof are shown in Table 1.

The critical point of $CO_2$ fluid is at the critical temperature of 31° C., and at the critical pressure of 72.8 atm. The critical point of Freon-12 (dichlorodifluoro methane; $CCl_2F_2$) is at 112° C., and 40.7 atm.

TABLE 1

| No. | Binder | Fluid | Temp. °C. | Pressure Kg/cm$^2$G | Weight of Green body g | Flow Rate l/min | Removal of binder % | Exposure Time Hrs. |
|---|---|---|---|---|---|---|---|---|
| 1. | Octadecanol | $CO_2$ | 100 | 65 | 10.07 | 191 | 0.2 | 2.1 |
| 2. | Octadecanol | $CO_2$ | 25 | 150 | 10.91 | 215 | 65.3 | 2.4 |
| 3. | Octadecanol | Freon-12 | 45 | 20 | 10.42 | 275 | 82.4 | 2.8 |
| 4. | Stearyl acid | $CO_2$ | 45 | 20 | 10.03 | 286 | 99.0 | 2.8 |

Freon (Trademark for a series of fluorocarbons)

In Table 1, No. 1 was above the liquidized state and therefore, the media was in a gas state, so that the fluid has little dissolving power, and the removal of the binder material could be effected only by the vapor pressure of the binder material, and therefore, there was extremely little removal efficiency of the binder materials.

Embodiments of Nos. 2 to 4 are in the scope of the claimed invention. In those examples, the preforms were exposed to fluids in a liquidized state, which fluid is gaseous under ambient temperature and ambient pressure, and the critical temperature thereof is above 0° C. The resulting removal efficiency of the binder was high without any deformation nor any defects including fracture and expansion of the preform.

It is to be noted that if the flow rate of the liquidized fluid is higher, the improvement of the removal of the binder materials as well as the shrinkage of the operation time are expected. There is shown that there was found somehow differences in the removals of binder materials and periods for removal among examples of Nos. 2 to 4. Those results are not limitative, for when the flow rate of the fluids is increased, the removal of the binder materials can be improved, and the period for removal can be decreased.

When injection moulding is used for forming of the preform in a given shape, a variety of the binder materials are used often in combination thereof under consideration of fluidability, formability and demouldability of the preform, and further, more amounts of the binder materials are frequently used. In such case, the removal by pyrolysis of the binder needs longer period of time.

Such injected preform can be treated in much shorter period for removal of binder materials by exposing the preform to the fluid in a liquidized state, and any deformation of the preform could not be found.

We claim:

1. A process for removing binder material(s) from a preform in a prefiring preparation for the production of ceramics in a given shape, which comprises the steps of exposing a preform comprising refractory particulate materials and binder materials in a given shape, to a liquidized fluid of a substance under pressure which is a gas under ambient temperature and atmospheric pressure thereby to dissolve binder material(s) in the fluid; discharging the fluid from a vessel under liquidizing conditions; and isolating said binder material(s) from a vaporized fluid by reducing the pressure of the fluid or elevating the temperature of the fluid thereby to recover the binder material(s) and fluid for further use thereof.

2. The process as claimed in claim 1, wherein the fluid is a gas under the conditions at 0° C. and atmospheric pressure.

3. The process as claimed in claim 2, wherein the fluid is a gas selected from the group consisting of $CO_2$, and fluorocarbon gas.

4. The process as claimed in claim 2, wherein the binder materials to be extracted are higher alcohols, fatty acids, higher hydrocarbons, and polyethylene.

5. A method for the production of ceramics in a given shape, which comprises the steps of:
   (1) forming a preform in a given shape from refractory particulate materials and binder materials in a controlled amount;
   (2) removing binder materials from the preform by exposing the preform comprising the refractory particulate materials and binder materials in a given shape, to a liquidized fluid of a substance under pressure which is a gas under ambient temperature and atmospheric pressure thereby to dissolve binder material in the fluid; discharging the fluid from a vessel under liquidizing conditions; and isolating said binder material from a vaporized fluid by reducing the pressure of the fluid or elevating the temperature of the fluid thereby to recover the binder materials and fluid for further use thereof, and then, sintering the preform into a ceramic in a given shape.

6. The method for the production of ceramics in a given shape, as claimed in claim 5, wherein the fluid is a gas selected from the group consisting of $CO_2$, and fluorocarbon gas.

7. A method of producing an article from a preform comprised of refractory particulate and binder materials whereby a binder material is removed from a preform prior to firing without deformation of the preform prior to the firing thereof, comprising the steps of:

(1) mixing together predetermined amounts of sinterable particulate material and binder whereby the binder covers substantially all of the surface of the particles of said particulate material,
(2) forming said mixture from (1) into a desired configuration,
(3) exposing said configuration to a liquidized fluid of a substance which is gaseous under ambient temperature and atmospheric pressure thereby to dissolve said binder materials in the fluid,
(4) isolating the binder materials from the fluid by reducing the pressure or elevating the temperature of the fluid thereby to recover the binder materials and fluid for further use thereof, and then,
(5) sintering said stripped and formed preform.

* * * * *